United States Patent Office 2,933,375
Patented Apr. 19, 1960

2,933,375

PROCESS FOR THE PREPARATION OF PHOSPHORUS PENTAFLUORIDE

Keith Clark Brinker, Wilmington, Del., assignor to E. I. du Pont de Nemours and Company, Wilmington, Del., a corporation of Delaware No Drawing. Application January 22, 1957
Serial No. 635,106

1 Claim. (Cl. 23—205)

The present invention relates to a process for preparing phosphorus pentafluoride and more particularly to a process for preparing phosphorus pentafluoride from phosphorus trifluoride.

Phosphorus pentafluoride in addition to its uses known heretofore is a preferred starting material in the recently discovered synthesis of fluorocarbon compounds and particularly of tetrafluoroethylene from carbon and inorganic or organic fluorides. In this synthesis the fluoride is heated to very high temperatures preferably above 2000° C. in the presence of carbon. At these temperatures carbon reacts with the fluoride to form fluorocarbon radicals which on cooling form fluorocarbon compounds. If the reaction products are rapidly cooled tetrafluoroethylene is formed in substantial quantities. Tetrafluoroethylene is primarily employed in the synthesis of polytetrafluoroethylene a polymer with unique heat and corrosion resistant properties. Phosphorus pentafluoride is preferred since in contrast to other fluorides it is only partially reacted forming gaseous and stable phosphorus trifluoride which can readily be removed from the reaction system and transformed back into phosphorus pentafluoride employing fluorine from readily available fluorspars. The phosphorus can thus be recycled and acts merely as a carrier for the fluorine in this reaction system.

One method of preparing phosphorus pentafluoride from phosphorus trifluoride is disclosed and claimed in copending application Serial No. 541,545, filed October 19, 1955, by E. L. Muetterties, now U.S. Patent 2,810,-629, issued October 22, 1957, in which phosphorus trifluoride is reacted with an alkaline earth metal fluoride such as calcium fluoride and a halogen, such as chlorine or bromine, to form calcium chloride and phosphorus pentafluoride. This method is not entirely without disadvantage since minor amounts of chlorine-containing impurities, particularly phosphorus pentachloride, are formed, the latter being a solid at temperatures below 162° C. This in itself is not serious in batch operations but can lead to plugging of lines and valves in continuous operations and as a result requires heated lines to convey the phosphorus pentafluoride. Furthermore, phosphorus pentafluoride because of its greater instability in less readily purified than the more stable phosphorus trifluoride from such impurities as hydrogen chloride, carbon dioxide, silicon tetrafluoride and phosphorus oxytrifluoride which are present when commercially available, low cost calcium fluorides are employed.

Another method for the preparation of phosphorus pentafluoride from phosphorus trifluoride is the reaction of the latter with equimolar quantities of a halogen to form a mixed fluoride such as phosphorus trifluorodichloride which readily decomposes into phosphorus pentafluoride and phosphorus pentachloride. This reaction, however, has the disadvantage of forming substantial quantities of phosphorus pentachloride which as described hereinabove being a solid, can easily interrupt the operation of a continuous process by plugging reactor beds, product lines and valves. Furthermore, phosphorus pentachloride is not readily reacted with naturally occurring metal fluorides to form phosphorus pentafluoride.

It is therefore, the object of the present invention to provide an improved process for the preparation of phosphorus pentafluoride. A further object is to prepare phosphorus pentafluoride by a gas phase reaction giving rise to products which are gaseous at room temperatures. Other objects will become apparent hereinafter.

The objects of the present invention are accomplished by a process which comprises heating a mixture of phosphorus trifluoride and a halogen selected from the class consisting of chlorine and bromine in a molar ratio of at least 5 to 3 to a temperature above 250° C. and recovering a product comprising phosphorus pentafluoride and phosphorus trihalide.

In accordance with the present invention it was found that the formation of undesirable phosphorus pentahalides could be entirely avoided by increasing the amount of the phosphorus trifluoride from equimolar quantities to a molar ratio of 5 to 3 in the reaction with halogen. By increasing the ratio and thereby having an excess of the phosphorus trifluoride present, the formation of the mixed phosphorus pentahalide and its subsequent decomposition into pentafluoride and pentabromide or pentachloride is surprisingly so avoided, and results instead in the formation of phosphorus trihalides.

Although the reaction can be carried out in batch operations, the reaction of the present invention being a gas phase reaction and resulting in gaseous products is much more suited for a continuous system comprising essentially nothing more than a heated reaction tube in which the gaseous mixture of the phosphorus trifluoride and the halogen is introduced at one end and the products are obtained at the other. Since, however, a minimum temperature of 250° C. is required to obtain complete conversion to the phosphorus pentafluoride it is generally preferred to fill the tube with an inert porous solid which permits improved heat transfer to the gas.

The ratio of the phosphorus trifluoride to the halogen employed is critical with respect to its lower limit which is a molar ratio of 5 to 3. Below that ratio solid phosphorus pentahalides are formed in varying amounts. The preferred ratios are those which slightly exceed the critical ratio of 5 to 3 and thus have a small excess of phosphorus trifluoride. Although increasing the ratio does not affect the operability of the process of the present invention, molar ratios of 6 to 3 or 7 to 3 are in general not desirable since excess phosphorus trifluoride will remain unchanged or can lead to the formation of side products such as mixed trivalent phosphorus halides which although not deleterious to the process, reduce the yield of the phosphorus pentafluoride on the basis of the phosphorus trifluoride employed in the reaction.

The process of the present invention is further illustrated by the following example:

*Example I*

A stainless steel reaction tube of 24" length and ¾" diameter filled with "Adsorbite," commercially available activated carbon, was heated to 400° C. and phosphorus trifluoride and chlorine was passed into the tube at a rate of 140 cc./min. and 70 cc./min. respectively. The product gases were passed through a room temperature trap and a cold trap maintained at −80° C. No solid or liquid product was isolated in the room temperature trap. A liquid product was obtained in the cold trap which was analyzed to be phosphorus trichloride containing traces of phosphorus difluoromonochloride and phosphorus monofluorodichloride. The gaseous product obtained from the cold trap was analyzed to be 98.8% phosphorus pentafluoride and 1.2% phosphorus trifluoride. The absence of a solid product in the room temperature trap showed that no solid phosphorus pentachloride had formed. The run was repeated without the use of carbon packing, and essentially the same results were obtained. No solid phosphorus pentachloride was obtained in the room temperature trap.

The foregoing example was then repeated without the carbon packing and at a ratio of less than 5 to 3. Phosphorus trifluoride was introduced at a rate of 70 cc./min. and chlorine at a rate of 70 cc./min. Although gaseous $PF_5$ was produced in this experiment, the room temperature trap was observed to be filling with a solid and after about 5 minutes of operation the run had to be terminated due to plugging of the exit line from the reaction tube. The solid was found to consist of $PCl_5$ and $(PCl_4^+)(PF_6^-)$.

While the above example has illustrated the process of the present invention with respect to the use of chlorine, essentially the same results are obtained when bromine is employed.

The contact time between the phosphorus trifluoride and the halogen necessary to achieve the formation of phosphorus pentafluoride is extremely small and may be considered as in many other inorganic gas phase reaction instantaneous. Contact times are therefore not determined by the rate of reaction but determined primarily by the efficiency of the heating and mixing of the gases. Although temperatures above 250° C. will cause the formation of phosphorus pentafluoride and phosphorus trifluoride it is generally preferred to employ reactor temperatures of 300 to 600° C. to allow for incomplete heat transfer. Reactor temperatures may, of course, be significantly higher, since the temperature of the gases can easily be reduced by increasing the feed rate if such is desired. The reaction is preferably carried out under substantially anhydrous conditions since phosphorus halides react violently with water.

The phosphorus trichloride obtained in the present invention is readily reacted by known procedures with naturally occurring fluorspars to form phosphorus trifluoride in quantitative yields. The phosphorus trifluoride formed in this manner can then be employed in the synthesis of phosphorus pentafluoride. In this way all of the phosphorus trifluoride formed in the fluorocarbon synthesis can be recycled as phosphorus pentafluoride with only minor losses of phosphorus. This two step conversion of phosphorus trifluoride to phosphorus pentafluoride has the advantage that low grade calcium fluorides may be employed, since phosphorus trifluoride is more readily purified than phosphorus pentafluoride from impurities formed when low grade fluorspar is employed. Furthermore the two step conversion avoids the conversion of solid phosphorus pentahalides and is thus better suited for continuous operation.

The present invention provides a method for the preparation of phosphorus pentafluoride in essentially quantitative yields which is particularly suited for continuous operation and avoids the formation of solid phosphorus pentahalides. The phosphorus pentafluoride obtained by the process of the present invention is of high purity and may be employed directly in the synthesis of tetrafluoroethylene by contact with carbon at temperatures about 2000° C. followed by rapid quenching. The phosphorus pentafluoride obtained by the illustrated process may further be employed as an acid catalyst and as such is useful in the promotion of certain organic reactions.

I claim:

A process for the preparation of phosphorus pentafluoride and phosphorus trichloride consisting essentially of admixing phosphorus trifluoride and chlorine in a molar ratio of 5 to 3 to 6 to 3, heating said mixture to a temperature of 300° to 600° C. under substantially anhydrous conditions, and separating phosphorus pentafluoride from the resulting mixture consisting substantially of phosphorus pentafluoride and phosphorus trichloride.

References Cited in the file of this patent

UNITED STATES PATENTS

| | | |
|---|---|---|
| 1,859,543 | Urbain | May 24, 1932 |
| 1,914,750 | Marsh | June 20, 1933 |
| 2,810,629 | Muetterties | Oct. 22, 1957 |

FOREIGN PATENTS

| | | |
|---|---|---|
| 814,139 | Germany | Sept. 20, 1951 |